(12) United States Patent
Sun et al.

(10) Patent No.: US 12,160,104 B2
(45) Date of Patent: Dec. 3, 2024

(54) METHOD AND SYSTEM FOR PREDICTING REGIONAL SHORT-TERM ENERGY POWER BY TAKING WEATHER INTO CONSIDERATION

(71) Applicant: SHANDONG UNIVERSITY, Shandong (CN)

(72) Inventors: Bo Sun, Jinan (CN); Chenghui Zhang, Jinan (CN); Deyin Ma, Jinan (CN)

(73) Assignee: SHANDONG UNIVERSITY, Jinan (CN)

(*) Notice: Subject to any disclaimer, the term of this patent is extended or adjusted under 35 U.S.C. 154(b) by 337 days.

(21) Appl. No.: 17/639,682

(22) PCT Filed: Sep. 2, 2020

(86) PCT No.: PCT/CN2020/113089
§ 371 (c)(1),
(2) Date: Mar. 2, 2022

(87) PCT Pub. No.: WO2021/043180
PCT Pub. Date: Mar. 11, 2021

(65) Prior Publication Data
US 2022/0294218 A1    Sep. 15, 2022

(30) Foreign Application Priority Data
Sep. 2, 2019   (CN) .......................... 201910823807.8

(51) Int. Cl.
*H02J 3/00*        (2006.01)
(52) U.S. Cl.
CPC .............. *H02J 3/003* (2020.01); *H02J 3/004* (2020.01); *H02J 2203/10* (2020.01); *H02J 2203/20* (2020.01); *H02J 2310/62* (2020.01)

(58) Field of Classification Search
CPC ........ H02J 3/003; H02J 3/004; H02J 2310/62; H02J 2203/20; H02J 2203/10
See application file for complete search history.

(56) References Cited

U.S. PATENT DOCUMENTS

| 10,374,547 B2* | 8/2019 | Shin ....................... G06Q 50/06 |
| 2012/0166085 A1* | 6/2012 | Gevorkian .............. F24S 21/00 702/62 |

(Continued)

FOREIGN PATENT DOCUMENTS

| CN | 102269124 A | 12/2011 |
| CN | 102609791 A | 7/2012 |

(Continued)

OTHER PUBLICATIONS

Dec. 2, 2020 International Search Report issued in International Patent Application No. PCT/CN2020/113089.

(Continued)

*Primary Examiner* — Vincent H Tran
(74) *Attorney, Agent, or Firm* — Oliff PLC

(57) ABSTRACT

A method and system for predicting regional short-term energy power by taking weather into consideration includes: obtaining meteorological data of all moments in a set time in the future through a network; extracting respectively, from a historical database according to the obtained meteorological data, historical weather station meteorological data, historical network API meteorological data, and historical measured power generation power data within a set time period that meet meteorological conditions corresponding to all the moments; obtaining historical total error data; obtaining real-time error meteorological data; obtaining total error meteorological data; combining the obtained meteorological data of all the moments in the set time in the future with total error meteorological data of all the moments to obtain predicted meteorological data; obtaining (Continued)

predicted power data according to the predicted meteorological data; and optimizing an energy generation plan of a system according to the obtained predicted power data.

5 Claims, 1 Drawing Sheet

(56) References Cited

U.S. PATENT DOCUMENTS

| | | | | |
|---|---|---|---|---|
| 2013/0093193 | A1* | 4/2013 | Schmidt | H02J 3/38 |
| | | | | 290/1 R |
| 2014/0244188 | A1 | 8/2014 | Bai et al. | |
| 2017/0336534 | A1* | 11/2017 | Forbes | G06F 17/10 |
| 2020/0026982 | A1* | 1/2020 | Clark | G06N 3/042 |
| 2020/0266628 | A1* | 8/2020 | Kato | H02J 3/004 |

FOREIGN PATENT DOCUMENTS

| | | | |
|---|---|---|---|
| CN | 102930358 | A | 2/2013 |
| CN | 103390202 | A | 11/2013 |
| CN | 103440531 | A | 12/2013 |
| CN | 104104760 | A | 10/2014 |
| CN | 104978614 | A | 10/2015 |
| CN | 105354620 | A | 2/2016 |
| CN | 105447509 | A | 3/2016 |
| CN | 105512775 | A | 4/2016 |
| CN | 110097205 | A | 8/2019 |
| CN | 110580549 | A | 12/2019 |
| JP | 2016093049 | A * | 5/2016 |

OTHER PUBLICATIONS

Dec. 2, 2020 Written Opinion issued in International Patent Application No. PCT/CN2020/113089.
Feb. 24, 2020 Office Action issued in Chinese Patent Application No. 201910823807.8.

* cited by examiner

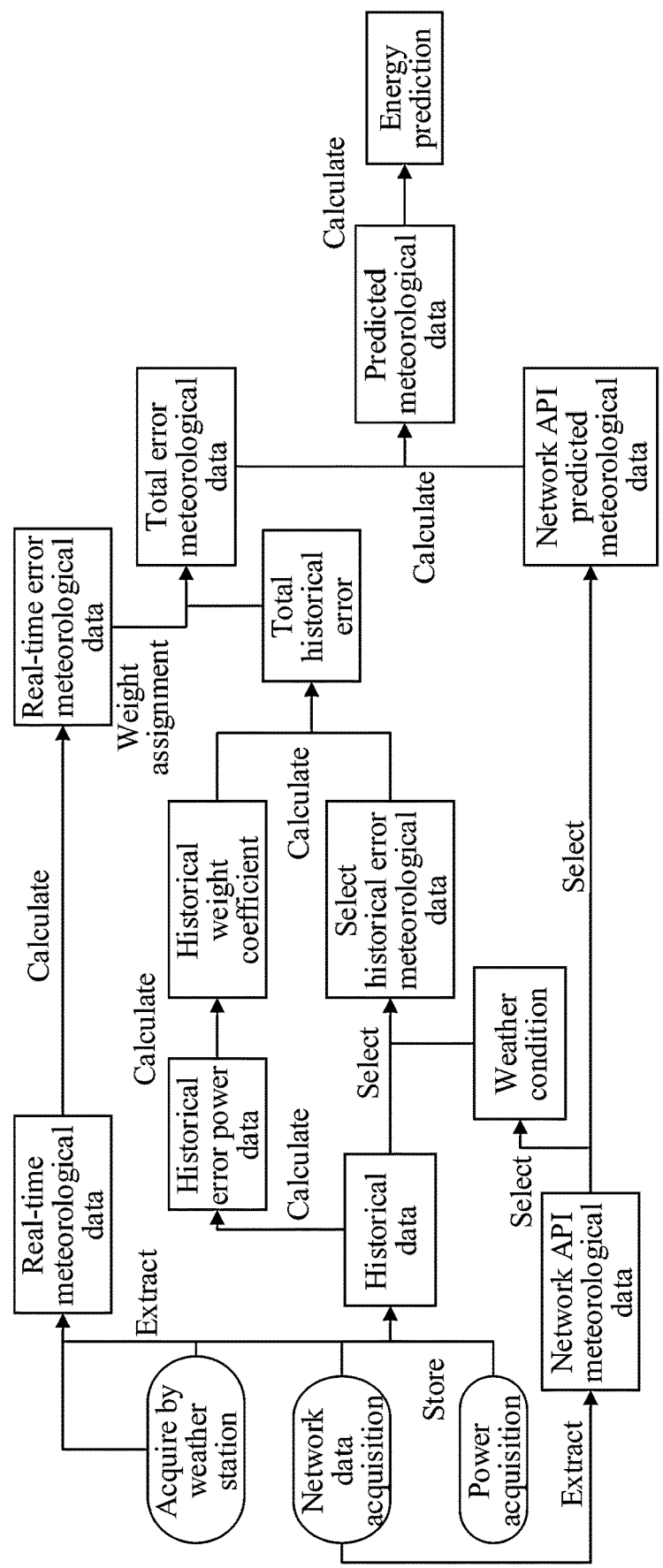

METHOD AND SYSTEM FOR PREDICTING REGIONAL SHORT-TERM ENERGY POWER BY TAKING WEATHER INTO CONSIDERATION

TECHNICAL FIELD

The present invention relates to the field of short-term energy prediction technologies, and in particular, to a method and system for predicting regional short-term energy power by taking weather into consideration.

BACKGROUND

The description in this section merely provides background information related to the present invention and does not necessarily constitute the prior art.

Environmental pollution and energy shortage bring enormous pressure to the society, causing the general public to be gradually aware of the importance of environmental protection. In an increasing number of regions, the development of new energy industries is encouraged, new energy development is to be promoted, and new energy power generation will become an important development direction. Photovoltaic and wind power generation systems become the main forms of modern new energy power generation. However, energy power of the system is greatly affected by meteorological data such as temperature, humidity, atmospheric pressure, solar radiation, wind speed, and wind direction, and weather changes have great uncertainty and randomness, which may cause the new energy power generation system to fail to run stably. Such fluctuations seriously affect the stability of a power grid and is not conducive to the power generation planning of the power grid. To reduce the impact of instability factors in grid connection of the new energy power generation system, and to optimize the operation of a subsequent power generation plan of the new energy system, the accuracy of a prediction system is particularly important.

The inventor found that in the calculation of system energy power and regional load, because a weather prediction value is usually brought into a mathematical model for calculation, the accuracy of the weather prediction value greatly affects the accuracy of power and load prediction. Currently, there are mainly two prediction methods. One is to directly use a weather forecast and bring the weather forecast into a model for calculation. Such a method is simple and easy to operate. However, weather forecast data is only a prediction of meteorological data of an entire region, the accuracy of prediction of the meteorological data at a fixed point is not accurate, and a large error in a weather value may affect the accuracy of the entire prediction system. The other method is to input a large amount of historical data into a neural network for calculation by using artificial intelligence, and sift corresponding meteorological data in the future. A large amount of historical data is used in such a method, resulting in high complexity of the method and an extremely high requirement for the quality of historical data. In addition, weather changes are random, and the accuracy of calculation using historical data is relatively low.

SUMMARY

To resolve the foregoing problems, the present invention provides a method and system for predicting regional short-term energy power by taking weather into consideration, to overcome, by combining weight assignment for errors between measured meteorological data and network meteorological data with various meteorological data, the problem of reduced prediction accuracy caused by errors and fluctuations in weather forecasts and overcome, by combining historical data with a weather forecast and using a trend in the weather forecast, the problem of uncertainty in predicting future weather by simply using historical data.

In some implementations, the following technical solution is adopted:

A method for predicting regional short-term energy power by taking weather into consideration is provided, including:
  obtaining meteorological data of all moments in a set time in the future through a network;
  extracting respectively, from a historical database according to the obtained meteorological data, historical weather station meteorological data, historical network API meteorological data, and historical measured power generation power data within a set time period that meet meteorological conditions corresponding to all the moments;
  determining historical error data and weight coefficient of all the moments according to the extracted historical data, to further obtain historical total error data;
  obtaining network real-time meteorological data and weather station real-time measured data respectively, to obtain real-time error meteorological data; and
  obtaining total error meteorological data according to the historical total error data and real-time error meteorological data;
  combining the obtained meteorological data of all the moments in the set time in the future with total error meteorological data of all the moments to obtain predicted meteorological data;
  obtaining predicted power data according to the predicted meteorological data; and
  optimizing an energy generation plan of a system according to the obtained predicted power data.

In some other implementations, the following technical solution is adopted:

A system for predicting regional short-term energy power by taking weather into consideration is provided, including:
  an apparatus configured to obtain meteorological data of all moments in a set time in the future through a network;
  an apparatus configured to extract respectively, from a historical database according to the obtained meteorological data, historical weather station meteorological data, historical network API meteorological data, and historical measured power generation power data within a set time period that meet meteorological conditions corresponding to all the moments;
  an apparatus configured to determine historical error data and weight coefficient of all the moments according to the extracted historical data, to further obtain historical total error data;
  an apparatus configured to obtain network real-time meteorological data and weather station real-time measured data respectively, to obtain real-time error meteorological data; and
  an apparatus configured to obtain total error meteorological data according to the historical total error data and the real-time error meteorological data;
  an apparatus configured to combine the obtained meteorological data of all the moments in the set time in the future with the total error meteorological data to obtain predicted meteorological data;

an apparatus configured to obtain predicted power data according to the predicted meteorological data; and an apparatus configured to optimize an energy generation plan according to the obtained predicted power data.

In some other implementations, the following technical solution is adopted:

a terminal device is provided, including a processor and a computer-readable storage medium, the processor being configured to implement instructions, and the computer-readable storage medium being configured to store a plurality of instructions, where the instructions are adapted to be loaded by the processor to perform the foregoing method for predicting regional short-term energy power by taking weather into consideration.

A computer-readable storage medium is provided, storing a plurality of instructions, where the instructions are adapted to be loaded by a processor of a terminal device to perform the foregoing method for predicting regional short-term energy power by taking weather into consideration.

Compared with the prior art, the present invention has the following beneficial effects:

The method in which various types of data are combined with a trend in a weather forecast as main data and historical data and real-time data as auxiliary data for correction only reduces the inaccuracy of a network weather forecast, but also overcomes the difficulty that weather changes have high randomness and cannot be predicted by using historical data.

Historical data, current data, and future data are combined, to obtain a more accurate regional weather forecast, which greatly improves the accuracy of self-regional source load prediction of a distributed power station, which, on the one hand, helps a system to provide a more accurate supply and demand plan to an energy grid, and on the other hand, helps the system to formulate a follow-up more reliable operation optimization policy for itself and improve the economic benefits of the system.

BRIEF DESCRIPTION OF THE DRAWINGS

FIG. 1 is a flowchart of a method for predicting regional short-term energy power by taking weather into consideration according to Embodiment 1.

DETAILED DESCRIPTION

It should be noted that the following detailed descriptions are all exemplary and are intended to provide a further understanding of this application. Unless otherwise specified, all technical and scientific terms used in the present invention have the same meaning as commonly understood by a person of ordinary skill in the art to which this application belongs.

It should be noted that terms used herein are only for describing specific implementations and are not intended to limit exemplary implementations according to this application. As used herein, the singular form is intended to include the plural form, unless the context clearly indicates otherwise. In addition, it should be further understood that terms "include" and/or "comprise" used in this specification indicate that there are features, steps, operations, devices, assemblies, and/or combinations thereof.

Embodiment 1

In one or more implementations, a method for predicting regional short-term energy power by taking weather into consideration is disclosed, as shown in FIG. 1, including the following steps:

Step 1: Obtain a weather forecast through a network to obtain weather conditions corresponding to all hours in the next 24 hours (for photovoltaic power generation, sunny, overcast, or cloudy is used, and for a wind speed, no wind, breeze, or the like is used), for example: sunny at 0 o'clock, cloudy at 1 o'clock, and cloudy at 23 o'clock.

Step 2: Extract, from a database, historical weather station meteorological data of n days that meets the weather conditions corresponding to all the moments. For example, if the weather conditions corresponding to the next 24 hours obtained from API meteorological data are: sunny at 1 o'clock, cloudy at 2 o'clock, rainy at 3 o'clock, . . . cloudy at 24 o'clock, when a historical database is searched for meteorological data of the corresponding moments, only data with same weather conditions is extracted. For example, for all historical 1 o'clock moments, only data in which a weather condition is sunny is extracted.

An average value of all values acquired on the hour is calculated and stored into a two-dimensional array array_avg_A. There are many extraction methods. The meteorological data can be extracted directly from a database by using LabVIEW and MySQL. Because this is short-term prediction, only hours are involved. Normal meteorological data is typically acquired every few seconds. For example, if data of 1 o'clock is needed, an average value of all data of 1 o'clock needs to be calculated. With regard to Array_avg_A, if each row represents data of 24 hours corresponding to each day in history, there are N rows when data of N days is extracted; and if each column represents daily meteorological data of each moment of 24 hours in history, there are 24 columns.

Step 3: Extract, from the database, historical n-day 24 h network API meteorological data that meets weather conditions corresponding to all the moments, and store the historical n-day 24 h network API meteorological data into a two-dimensional array array_avg_B. A form of array_avg_B is the same as a form of array_avg_A, except that A stores historical measured data, and B stores historical API meteorological data.

Step 4: Subtract a weather station data array from a network meteorological data array to obtain a two-dimensional error array array_error_C.

Step 5: Extract, from the database, historical n-day power generation data that meets weather conditions corresponding to all the moments, and store the historical n-day power generation data into a two-dimensional array array_avg_F.

Step 6: Bring the obtained meteorological data measured by a local weather station into a power calculation model or another power calculation method that finally needs to be used, to obtain calculated power data, and store the calculated power data into a two-dimensional array array_pro_G.

Step 7: Compare array_avg_F with array_pro_G, and select n weight coefficients $0<=Dn<=1$, to make $D1+D2+ \ldots +Dn=1$. A power error determines a value of each weight. The smaller the error, the larger the assigned weight D.

Step 8: Multiply a corresponding weight coefficient Dn by all rows corresponding to the two-dimensional array array_error_C, and then add the rows to obtain a one-dimensional historical error array_error_H. For example, for 1 o'clock, if pieces of historical data of 10 days are extracted, the pieces of historical data of the 10 days need to be integrated according to assigned weights of the pieces of historical data into data of one day, as total historical data, and so do the 24 moments Step 9: Obtain a network weather forecast for the next 24 hours, and store a types of weather forecast values for the next 24 hours into a one-dimensional array array_pre_I.

Step 10: Obtain network real-time meteorological data J and subtract the network real-time meteorological data J from real-time measured data K acquired by the weather station to obtain a real-time error er=|J−K|. er is a numerical value that represents a difference between real-time network data and measured meteorological data.

Step 11: Select an error weight coefficient array M again, store 24 different weight coefficients into M, multiply array_error_H by M, and then add er multiplied by (1−M) to a resultant array to obtain a total error array array_error_ER.

M represents one weight and 1−M represents another weight, thereby implementing weighted integration of a real-time error and a historical error.

Step 12: Add a weather forecast array and a total error array to obtain a weather forecast value, array_pre_I+array_error_ER—array_wea_a.

Step 13: Bring the weather forecast value into a selected power calculation method to obtain required source load power (energy power and load power).

Embodiment 2

In one or more embodiments, a system for predicting regional short-term energy power by taking weather into consideration is disclosed, including:
- an apparatus configured to obtain meteorological data of all moments in a set time in the future through a network;
- an apparatus configured to extract respectively, from a historical database according to the obtained meteorological data, historical weather station meteorological data, historical network API meteorological data, and historical measured power generation power data within a set time period that meet meteorological conditions corresponding to all the moments;
- an apparatus configured to determine historical error data and weight coefficient of all the moments according to the extracted historical data, to further obtain historical total error data;
- an apparatus configured to obtain network real-time meteorological data and weather station real-time measured data respectively, to obtain real-time error meteorological data; and
- an apparatus configured to obtain total error meteorological data according to the historical total error data and the real-time error meteorological data;
- an apparatus configured to combine the obtained meteorological data of all the moments in the set time in the future with the total error meteorological data to obtain predicted meteorological data;
- an apparatus configured to obtain predicted power data according to the predicted meteorological data; and
- an apparatus configured to optimize an energy generation plan according to the obtained predicted power data.

Embodiment 3

In one or more implementations, a terminal device is provided, including a server. The server includes a memory, a processor, and a computer program stored in the memory and executable on the processor. The processor, when executing the program, implements the method for predicting regional short-term energy power by taking weather into consideration in Embodiment 1. For brevity, details are not described herein again.

It should be understood that in this embodiment, the processor may be a central processing unit (CPU); or the processor may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general-purpose processor may be a microprocessor, or the processor may be any conventional processor and the like.

The memory may include a read-only memory and a random-access memory, and provide an instruction and data to the processor. A part of the memory may further include a non-volatile random-access memory. For example, the memory may further store information about a device type.

During implementation, the steps of the foregoing method may be completed through an integrated logic circuit of hardware or an instruction in the form of software in the processor.

The method for predicting regional short-term energy power by taking weather into consideration in Embodiment 1 may be directly performed and completed by a hardware processor, or may be performed and completed by using a combination of hardware and software modules in the processor. The software module may be located in a mature storage medium in the field such as a random access memory, a flash memory, a read-only memory, a programmable read-only memory, an electrically erasable programmable memory, or a register. The storage medium is located in the memory. The processor reads information in the memory and completes the steps of the foregoing methods in combination with hardware thereof. To avoid repetition, details are not described herein again.

A person of ordinary skill in the art may notice that the exemplary units and algorithm steps described with reference to this embodiment can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application.

The specific implementations of the present disclosure are described above with reference to the accompanying drawings, but are not intended to limit the protection scope of the present invention. A person skilled in the art should understand that various modifications or deformations may be made without creative efforts based on the technical solutions of the present disclosure, and such modifications or deformations shall fall within the protection scope of the present invention.

What is claimed is:

1. A method for maintaining a stability of a power grid, wherein the power grid is connected with an energy power generation system comprising photovoltaic and wind power generation systems, the method comprising;
   by a processor,
   predicting regional short-term energy power by taking weather into consideration, comprising:
   obtaining meteorological data of all moments in a set time in the future through a network;
   extracting respectively, from a historical database according to the obtained meteorological data, historical weather station meteorological data, historical network API meteorological data, and historical measured power generation power data within a set time period that meet meteorological conditions corresponding to all the moments;

determining historical error data and weight coefficient of all the moments according to the extracted historical data, to further obtain historical total error data;

obtaining network real-time meteorological data and weather station real-time measured data respectively, to obtain real-time error meteorological data;

obtaining total error meteorological data according to the historical total error data and the real-time error meteorological data, specifically comprising:

storing the historical total error data into a one-dimensional array array_error_H, and storing the real-time error meteorological data into a one-dimensional array er;

selecting an error weight coefficient array M, the array M comprising weight coefficient of all the moments, multiplying the array array_error_H by the error weight coefficient array M to obtain a new array, and then adding a result of multiplying the array er by an array (1−M) to the new array to obtain a total error array array_error_ER;

combining the obtained meteorological data of all the moments in the set time in the future with total error meteorological data of all the moments to obtain predicted meteorological data; obtaining predicted power data according to the predicted meteorological data; and adjusting a set value of the energy power of the energy power generation system connected in the power grid in the set time in the future to match with the obtained predicted power data, to reduce an impact of a fluctuation of the energy power of the energy power generation system to the power grid in the set time in the future to maintain the stability of the power grid.

2. The method for maintaining the stability of the power grid according to claim 1, wherein the determining historical error data of all the moments according to the extracted historical data specifically comprises:

storing the extracted historical weather station meteorological data into a two-dimensional array array_avg_A;

storing the extracted historical network API meteorological data into a two-dimensional array array_fro_B; and subtracting values of the two-dimensional array array_avg_A from values of the two-dimensional array array_fro_B to obtain a two-dimensional historical error array array_error_C of all the moments.

3. The method for maintaining the stability of the power grid according to claim 1, wherein the determining weight coefficients of all the moments according to the extracted historical data specifically comprises:

storing the extracted historical measured power generation data of all the moments into a two-dimensional array array_avg_F;

calculating power generation data of all the moments according to the extracted historical weather station meteorological data, and storing the power generation data into a two-dimensional array array_pro_G; and comparing the two-dimensional array array_avg_F with the two-dimensional array array_pro_G to obtain a power error, and selecting, according to the power error, n weight coefficients $0<=Dn<=1$ to make $D1+D2+ \ldots +Dn=1$.

4. A terminal device, comprising:

a processor configured to implement instructions to execute the method for maintaining the stability of the power grid according to claim 1; and a computer-readable storage medium configured to store a plurality of instructions, including the instructions to execute the method for maintaining the stability of the power grid according to claim 1.

5. A computer-readable storage medium, storing a plurality of instructions, wherein the plurality of instructions include the instructions to execute the method for maintaining the stability of the power grid according to claim 1.

* * * * *